(12) United States Patent
Andrews

(10) Patent No.: US 11,465,656 B2
(45) Date of Patent: Oct. 11, 2022

(54) RAILCAR BACKUP COOLING SYSTEM

(71) Applicant: Trinity Rail Group, LLC, Dallas, TX (US)

(72) Inventor: Carter Ray Andrews, Dallas, TX (US)

(73) Assignee: TRINITY RAIL GROUP, LLC, Dallas, TX (US)

( * ) Notice: Subject to any disclaimer, the term of this patent is extended or adjusted under 35 U.S.C. 154(b) by 223 days.

(21) Appl. No.: 16/881,244

(22) Filed: May 22, 2020

(65) Prior Publication Data

US 2021/0009173 A1 Jan. 14, 2021

Related U.S. Application Data

(60) Provisional application No. 62/873,627, filed on Jul. 12, 2019.

(51) Int. Cl.
  *F25D 3/10* (2006.01)
  *B61D 27/00* (2006.01)
  *B60H 1/00* (2006.01)

(52) U.S. Cl.
  CPC ..... *B61D 27/0081* (2013.01); *B60H 1/00014* (2013.01); *F25D 3/105* (2013.01)

(58) Field of Classification Search
  CPC .. B61D 27/0081; F25D 3/105; B60H 1/00014
  See application file for complete search history.

(56) References Cited

U.S. PATENT DOCUMENTS

| | | | | |
|---|---|---|---|---|
| 3,705,500 A * | 12/1972 | Jehle | ...... | F25D 3/105 62/223 |
| 4,498,306 A * | 2/1985 | Tyree, Jr. | ...... | F28D 15/0275 62/239 |
| 5,069,039 A * | 12/1991 | Martin | ...... | F25D 3/105 62/526 |
| 5,699,670 A * | 12/1997 | Jurewicz | ...... | F25D 29/001 62/50.3 |
| 6,345,509 B1 * | 2/2002 | Garlov | ...... | A23L 3/36 62/62 |
| 2006/0065004 A1 * | 3/2006 | Lee | ...... | F25B 25/005 62/434 |

* cited by examiner

*Primary Examiner* — David J Teitelbaum
(74) *Attorney, Agent, or Firm* — Baker Botts, LLP

(57) ABSTRACT

A railcar backup cooling system may be added to an existing railcar (e.g., a boxcar) to provide supplemental or backup cooling to the railcar in the event that an HVAC failure or other circumstance occurs, which causes the interior temperature of the railcar to rise. The system includes a container of liquid or compressed gas mounted on the railcar, a valve controlling the flow of the liquid or gas from the container, and a controller configured to open the valve when the HVAC system fails or is otherwise unable to maintain the railcar at the desired temperature. When the valve is opened, the liquid and/or gas stored in the container may exit, expanding into a cool gas and thereby acting to cool the railcar environment.

17 Claims, 4 Drawing Sheets

RAILCAR BACKUP COOLING SYSTEM

RELATED APPLICATION AND CLAIM TO PRIORITY

This application claims priority to U.S. Provisional Application No. 62/873,627 filed Jul. 12, 2019 and titled "BOXCAR BACKUP COOLING SYSTEM," which is incorporated herein by reference.

TECHNICAL FIELD OF THE INVENTION

This disclosure relates generally to railcars, and more particularly to a backup cooling system for a refrigerated railcar.

BACKGROUND

Railcars (e.g., railway boxcars) are often used to transport perishable cargo across large distances, via railroad lines. To prevent the cargo from spoiling, railcars equipped with refrigeration units and insulated sidewalls are often employed, to maintain the interiors of the railcars at desired temperatures.

SUMMARY

Railcars (e.g., railway boxcars) are often used to transport perishable cargo across large distances, via railroad lines. To prevent the cargo from spoiling, railcars that are equipped with refrigeration units and insulated sidewalls are often employed, to maintain the interiors of the railcars at desired temperatures. These desired temperatures may vary according to the type of cargo to be shipped within the railcars. For example, frozen commodities may need to be maintained at low temperatures, below the freezing point, while fresh produce may need to be maintained at somewhat higher temperatures, above freezing. Given the size of conventional railcars, the value of the commodity transported in a fully-loaded railcar can easily exceed $100,000. Accordingly, significant financial loss may result if the interior temperature of the railcars are not maintained at the desired temperature and the commodity within the railcars spoils.

Normally, the heating, ventilation, and air conditioning (HVAC) units installed in typical railcars operate as intended. However, as with other types of equipment, they may occasionally fail. When this happens, a sensor system that monitors the HVAC system may alert railway employees to the failure. The railcar containing the malfunctioning HVAC system may then be separated from the train to which it was attached and taken out of service to await repair. Unfortunately, it may take several days for a repair team to be dispatched and reach the railcar. During this time, the temperature within the railcar may begin to rise, at a rate dependent upon the design and condition of the railcar. If the temperature rises above a certain level (dependent on the type of commodity transported within the railcar), before the HVAC system can be repaired, the commodity may need to be discarded, potentially resulting in significant financial loss.

This disclosure contemplates a railcar backup cooling system that addresses one or more of the above issues. The system may be added to an existing railcar (e.g., a boxcar) to provide supplemental or backup cooling to the railcar in the event that an HVAC failure or other circumstance occurs, which causes the interior temperature of the railcar to rise. The system includes a container of liquid or compressed gas mounted on the railcar, a valve controlling the flow of the liquid or gas from the container, and a controller configured to open the valve when the HVAC system fails or is otherwise unable to maintain the railcar at the desired temperature. When the valve is opened, the liquid and/or gas stored in the container may exit, expanding into a cool gas and thereby acting to cool the railcar environment.

Certain embodiments of the railcar backup cooling system may provide one or more technical advantages. For example, an embodiment may reduce the internal temperature of a railcar or other vehicle that is used to transport perishable cargo. As another example, when an HVAC system in a refrigerated railcar fails, an embodiment may provide supplemental cooling and thereby extend the time available to affect repairs, before perishable cargo transported within the railcar spoils. As another example, when an HVAC system in a refrigerated railcar fails, an embodiment may provide sufficient cooling over a long enough period of time such that the railcar may continue to its intended unloading destination, where the cargo may be unloaded normally, without any of the cargo spoiling. As a further example, an embodiment may eliminate the need to separate a railcar suffering an HVAC failure from the rest of the train to which it is connected. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
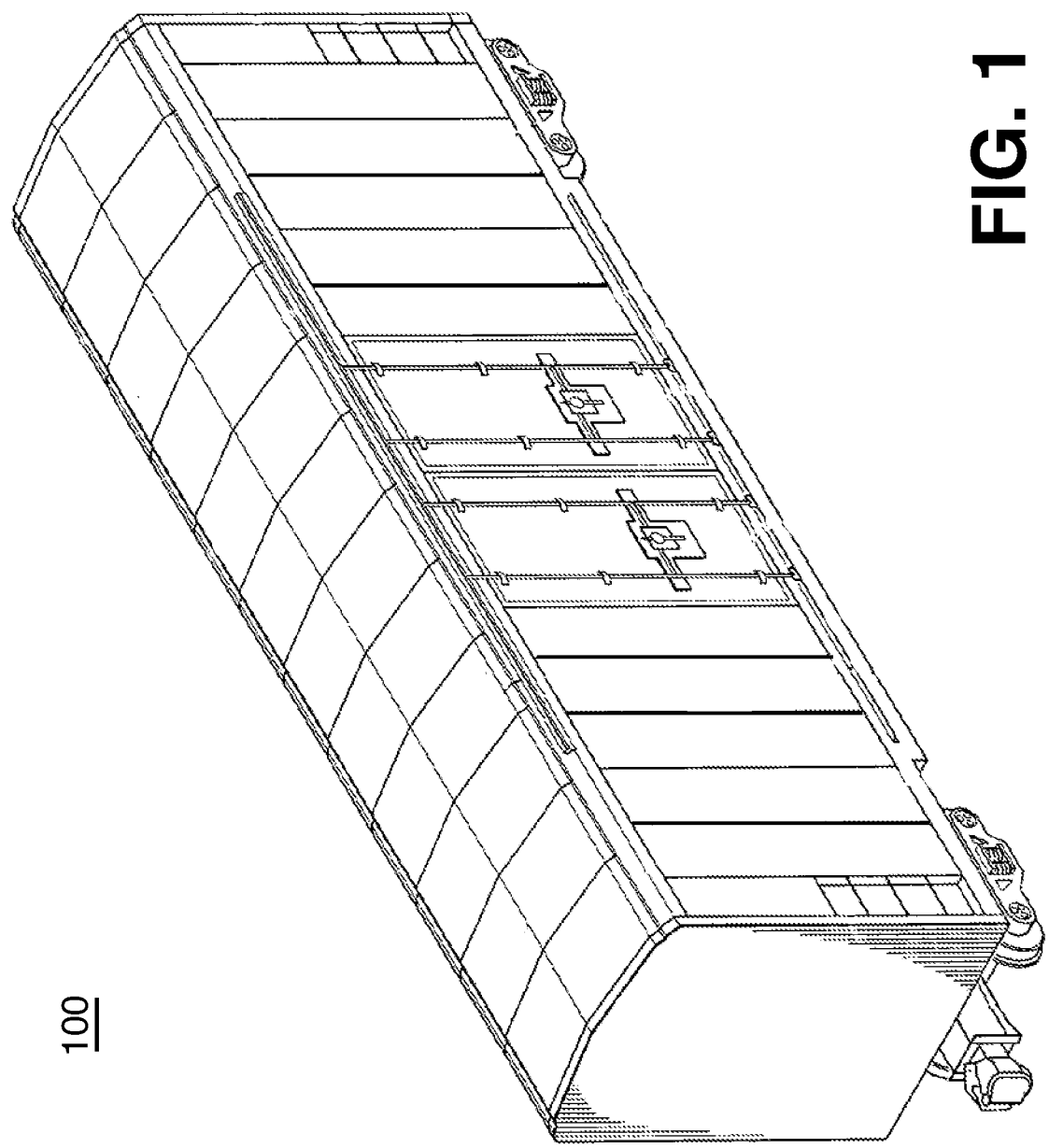
FIG. 1 illustrates an example railcar.
Figure 2:
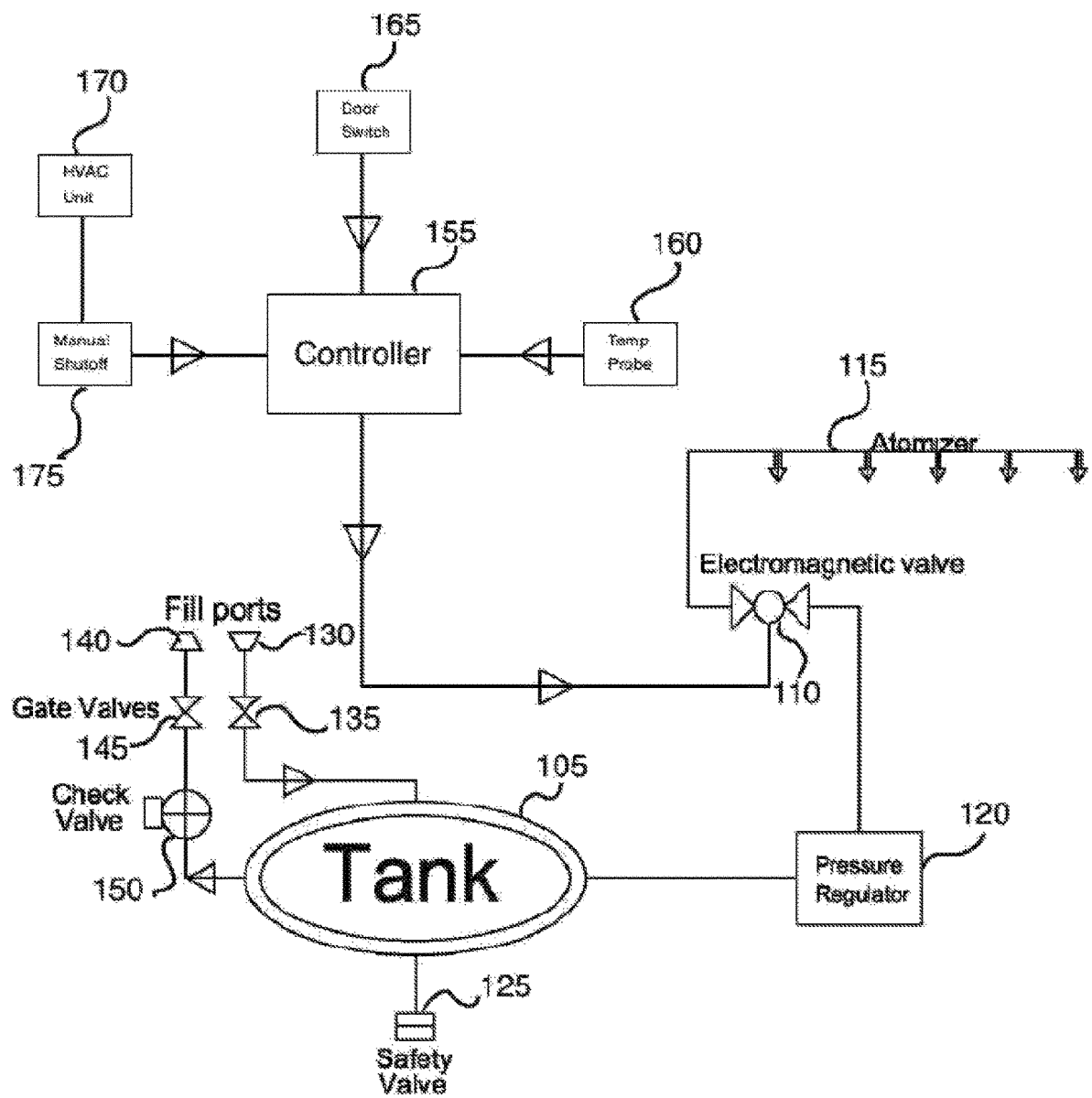
FIG. 2 illustrates an example embodiment of a railcar backup cooling system, which includes a direct cooling system, for use in the railcar of FIG. 1.
Figure 3:
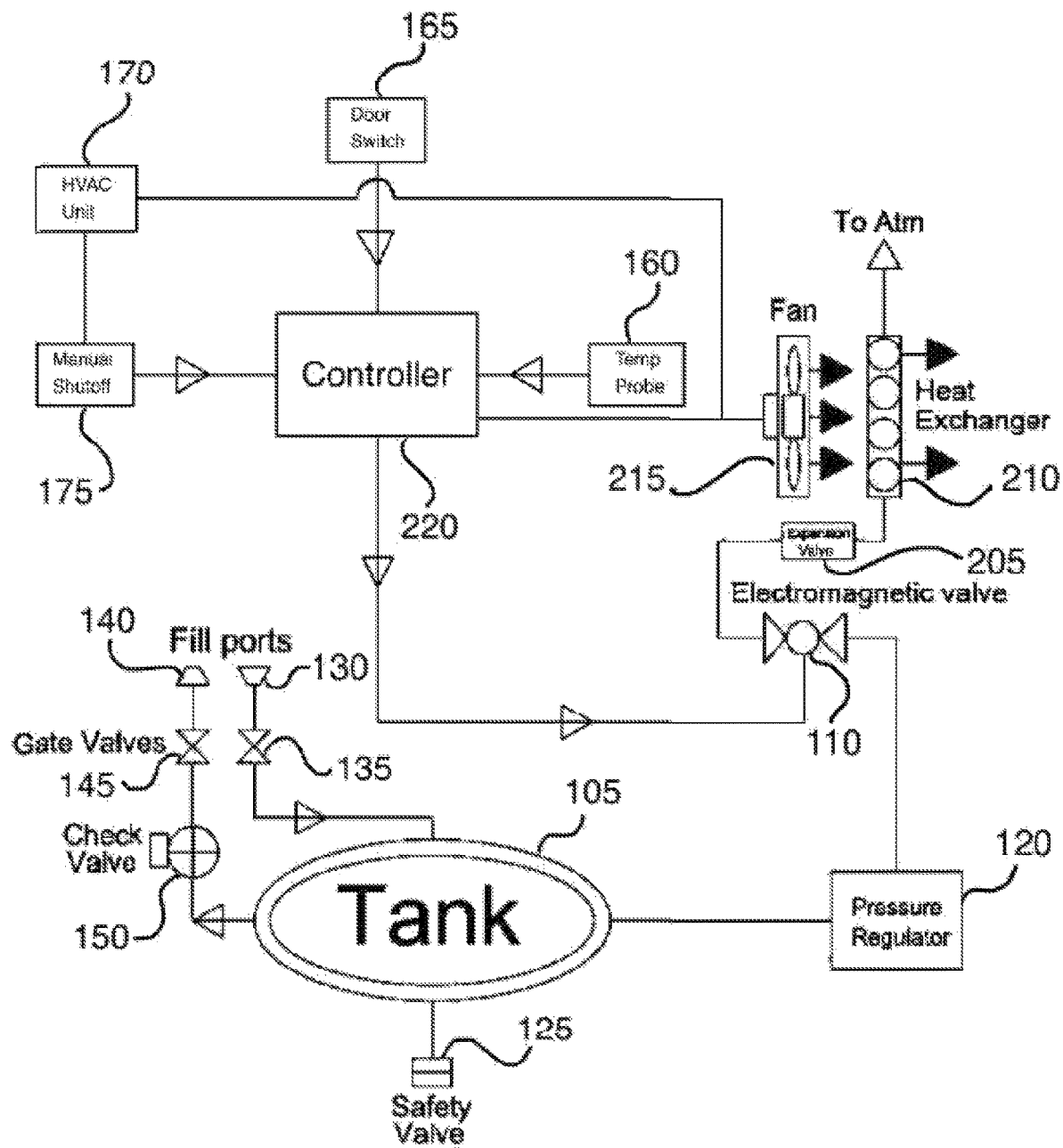
FIG. 3 illustrates an example embodiment of a railcar backup cooling system, which includes an indirect cooling system, for use in the railcar of FIG. 1.
Figure 4:
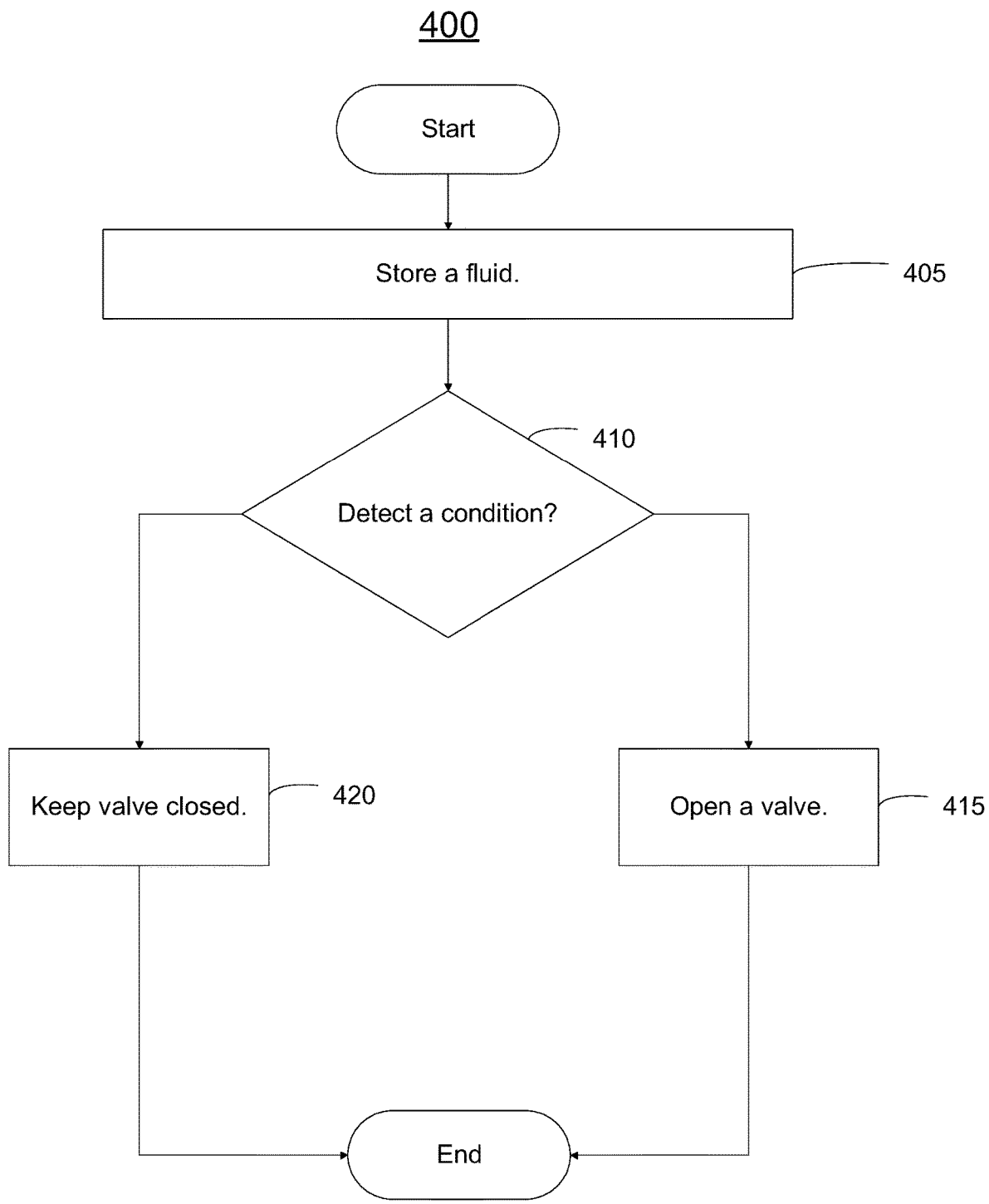
FIG. 4 is a flowchart illustrating a method of operating a railcar backup cooling system for use in the railcar of FIG. 1.

Embodiments of the present disclosure and its advantages are best understood by referring to FIGS. 1 through 3 of the drawings, like numerals being used for like and corresponding parts of the various drawings.

Railway railcars (e.g., boxcars) are often used to transport perishable cargo across large distances, via railroad lines. To prevent the cargo from spoiling, railcars that are equipped with refrigeration units and insulated sidewalls are often employed, to maintain the interiors of the railcars at desired temperatures. These desired temperatures may vary according to the type of cargo to be shipped within the railcars. For example, frozen commodities may need to be maintained at low temperatures, below the freezing point, while fresh produce may need to be maintained at somewhat higher temperatures, above freezing. Given the size of conventional railcars, the value of the commodity transported in a fully-loaded railcar can easily exceed $100,000. Accordingly, significant financial loss may result if the interior temperature of the railcar is not maintained at the desired temperature and the commodity within the railcar spoils.

Normally, the heating, ventilation, and air conditioning (HVAC) units installed in typical railcars operate as intended. However, as with other types of equipment, they may occasionally fail. When this happens, a sensor system that monitors the HVAC system may alert railway employees to the failure. The railcar containing the malfunctioning HVAC system may then be separated from the train to which it was attached and taken out of service to await repair. Unfortunately, it may take several days for a repair team to be dispatched and reach the railcar. During this time, the temperature within the railcar may begin to rise, at a rate dependent upon the design and condition of the railcar. If the temperature rises above a certain level (dependent on the type of commodity transported within the railcar), before the HVAC system can be repaired, the commodity may need to be discarded, potentially resulting in significant financial loss.

This disclosure contemplates a railcar backup cooling system that addresses one or more of the above issues. The system may be added to an existing railcar (e.g., a boxcar) to provide supplemental or backup cooling to the railcar in the event that an HVAC failure or other circumstance occurs, which causes the interior temperature of the railcar to rise. The system includes a container of liquid or compressed gas mounted on the railcar, a valve controlling the flow of the liquid or gas from the container, and a controller configured to open the valve when the HVAC system fails or is otherwise unable to maintain the railcar at the desired temperature. When the valve is opened, the liquid and/or gas stored in the container may exit, expanding into a cool gas and thereby acting to cool the railcar environment. The railcar backup cooling system will be described in further detail using FIGS. 1 through 3.

FIG. 1 illustrates a railcar 100 into which the backup cooling system may be installed. In certain embodiments, railcar 100 may be a refrigerated railcar. In certain such embodiments, railcar 100 may contain a refrigeration unit or any other unit operable to provide cooling to the interior of railcar 100. For example, in certain embodiments, railcar 100 may contain an HVAC system. Railcar 100 may also contain insulated sidewalls to help inhibit the flow of heat from a warmer environment outside railcar 100 to the cooler interior of railcar 100. In certain such embodiments, the insulated sidewalls may contain foam, fiber, or any other type of insulating material. Although the example railcar 100 is a boxcar, railcar 100 may be any suitable type of railcar.

FIGS. 2 and 3 illustrate two different embodiments of the railcar backup cooling system. Either embodiment may be installed in railcar 100 to provide supplemental cooling to the railcar in the event of a failure of the HVAC system installed in railcar 100, or any other circumstance that causes the interior of railcar 100 to rise above a desired level.

FIG. 2 illustrates an example railcar backup cooling system 200. System 200 may provide direct cooling to commodities transported in railcar 100, when the temperature in railcar 100 rises above a desired level.

As can be seen in FIG. 2, backup cooling system 200 includes tank 105, valve 110, atomizer 115, pressure regulator 120, and controller 155. Controller 155 may control valve 110, in embodiments in which valve 110 is an electromagnetic valve. In certain embodiments, controller 155 may open electromagnetic valve 110 to cause pressurized fluid stored in tank 105 to travel from tank 105, through valve 110, and to atomizer 115. As the fluid leaves tank 105, the pressure of the fluid may decrease, allowing the fluid to expand into a cool gas. Atomizer 115 may then spray the cool gas directly onto a commodity transported in railcar 100, thereby cooling the commodity.

This disclosure contemplates that tank 105 may be stored in any suitable location in railcar 100. For example, in certain embodiments, tank 105 may be stored behind a bulkhead of railcar 100. Tank 105 may be configured to store pressured liquid or gas. This disclosure contemplates that tank 105 may store any type of liquid or gas suitable for use as a cooling fluid. For example, tank 105 may store pressurized carbon dioxide, nitrogen, helium, or any other appropriate liquid or gas.

This disclosure contemplates that tank 105 may be filled with compressed fluid (e.g., carbon dioxide or any suitable refrigerant) in any suitable manner. For example, in certain embodiments, fill port 130 may be used to fill tank 105. In certain embodiments, fill port 130 may be connected to tank 105 by a tube through which the compressed liquid/gas may flow from fill port 130 to tank 105. This tube may contain gate valve 135, which may be opened prior to filling tank 105. When opened, gate valve 135 may allow for an unobstructed flow of the compressed liquid/gas from fill port 130 to tank 105. After tank 105 has been filled, gate valve 135 may be closed, to prevent the compressed liquid/gas from exiting tank 105. In certain embodiments, gate valve 135 is a manual valve, such that a rail line employee manually opens valve 135 prior to filling tank 105 and manually closes valve 135 after filling tank 105.

In certain embodiments, safety valve 125 may be coupled to tank 105. Safety valve 125 may prevent the pressure within tank 105 from exceeding a threshold value. In certain embodiments, safety valve 125 may be a one-way valve, such that safety valve 125 prevents external air from entering tank 105 but allows pressurized liquid/gas to leave tank 105 when the pressure within tank 105 exceeds the threshold value. In certain embodiments, safety valve 125 is a spring-loaded safety valve, which is held closed by a force generated by a spring of the safety valve. In such embodiments, safety valve 125 may open when a pressure from the compressed fluid stored in tank 105 exceeds the pressure generated by the spring force of the spring. In certain other embodiments, safety valve 125 may be a rupture disk, that fails at a predetermined differential pressure. In certain embodiments, safety valve 125 may be directly coupled to tank 105. In other embodiments, safety valve 125 may be connected to tank 105 by a tube. In certain embodiments, the use of safety valve 125 helps to ensure that tank 105 does not explode, thereby helping to prevent damage to railcar 100, cargo transported within railcar 100, and/or rail line employees, when the pressure inside tank 105 exceeds the threshold level.

This disclosure contemplates that in certain embodiments, system 200 may also contain a drainage system coupled to tank 105, to allow the fluid stored in tank 105 to be removed from the tank. In certain such embodiments (and as illustrated in FIG. 2), the drainage system may include drainage port 140, gate valve 145, and check valve 150. In certain embodiments, drainage port 140 may be connected to tank 105 by a tube through which the liquid/gas stored in tank 105 may flow while it is draining from tank 105 through drainage port 140. This tube may contain gate valve 145. Gate valve 145 may generally be closed, to prevent the compressed fluid stored in tank 105 from exiting the tank through drainage port 140, when drainage port 140 is not being used to drain tank 105. When opened, gate valve 145 may allow for an unobstructed flow of the fluid stored in tank 105 to drainage port 140. Accordingly, gate valve 145 may be opened prior to draining tank 105. In certain embodiments, gate valve 145 is a manual valve, such that a rail line employee may manually open valve 145 prior to draining tank 105.

This disclosure contemplates that the liquid/gas stored in tank 105 may be drained from tank 105—through open gate valve 145 and drainage port 140—in any appropriate manner. For example, in certain embodiments, tank 105 may be drained using a pump. As another example, in certain embodiments, tank 105 may be drained by gravity.

The pressurized fluid stored in tank 105 may be used to cool the interior of railcar 100. Cooling may occur by releasing the fluid from tank 105, thereby allowing the fluid to expand into a cool gas, which may then absorb heat from within railcar 100. Valve 110 may be used to control the flow of the fluid from tank 105. When opened, valve 110 enables fluid stored in tank 105 to flow from tank 105 through valve 110. In contrast, when closed, valve 110 prevents fluid stored in tank 105 from flowing out of tank 105 through valve 110. This disclosure contemplates that valve 110 may be opened/closed in any appropriate manner. For example, in certain embodiments, valve 110 may be a manual valve, such that a rail line employee may manually open valve 110 in the event of an HVAC failure within railcar 100. As another example, in certain embodiments, valve 110 may be an electromagnetic valve controlled by controller 155. In such embodiments, controller 155 may open/close electromagnetic valve 110 in response to any number of signals or combinations of signals received from elements within the system. For example, in certain embodiments, controller 155 may receive signals from temperature probe 160. Temperature probe 160 may be configured to measure a temperature within the interior of railcar 100. Controller 155 may be configured to receive the temperature measured by temperature probe 160 and to open electromagnetic valve 110 if the measured temperature is greater than a set threshold temperature. This threshold may be adjustable by an operator of system 200. For example, if railcar 100 is transporting frozen meals, the system operator may set the threshold to a lower temperature than if railcar 100 is transporting fresh produce. This disclosure contemplates the use of any number of temperature probes 160 located at various locations within the interior of railcar 100. Controller 155 may be configured to open electromagnetic valve 110 in response to the average temperature measured by temperature probes 160 exceeding the threshold, or in response to the temperature measured by any one of temperature probes 160 exceeding the threshold.

As another example, in certain embodiments, controller 155 may receive signals from door switch 165. Door switch 165 may be configured to determine or detect that a door of railcar 100 is open and to send a signal to controller 155 indicating that the door of railcar 100 is open. In response to receiving the signal from door switch 165 indicating that a door of railcar 100 is open, controller 155 may be configured not to open electromagnetic valve 110, even if controller 155 has also received a signal from temperature probe 160 indicating that the temperature within railcar 100 has exceeded the threshold. This may be desirable to prevent backup cooling system 200 from releasing the fluid stored in tank 105 during loading/unloading of railcar 100, when a door of railcar 100 is open such that the interior temperature within railcar 100 may rise temporarily, as warm air from outside railcar 100 is able to mix within cooler air inside railcar 100, even though the HVAC system of railcar 100 is fully operational.

As another example, in certain embodiments, controller 155 may receive signals from the primary HVAC system 170 installed/operating in railcar 100. For example, certain HVAC systems installed in refrigerated railcars include a refrigeration unit and a variety of sensors that monitor the operation of these systems. Such sensors may be configured to send an alert (for example, to a system monitor) in the event of an HVAC system failure. This disclosure contemplates coupling the primary HVAC system 170 to controller 155, such that controller 155 may receive alerts from HVAC system 170, in the event of an HVAC system failure (e.g., failure of one or more refrigeration units). In response to receiving such alerts, controller 155 may be configured to open electromagnetic valve 110.

As a further example, in certain embodiments, controller 155 may receive signals from a manual switch 175. For example, in certain embodiments, a rail line employee may manually operate backup cooling system 200 by turning a switch connected to controller 155, thereby instructing controller 155 to open electromagnetic valve 110. In certain embodiments, manual switch 175 may be remotely controlled, such that a rail line employee may be able to operate switch 175 remotely, over a network.

This disclosure contemplates that, in certain embodiments, temperature probe 160, door switch 165, HVAC system 170, and manual switch 175 may be connected directly to controller 155 by a wired connection. This disclosure additionally contemplates that, in certain embodiments, one or more of temperature probe 160, door switch 165, HVAC system 170, and manual switch 175 may be connected to controller 155 over a network. The network may be any suitable network operable to facilitate communication between one or more of temperature probe 160, door switch 165, HVAC system 170, and manual switch 175. The network may include any interconnecting system capable of transmitting audio, video, signals, data, messages, or any combination of the preceding. The network may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

After the pressurized fluid stored in tank 105 is released through valve 110, it may be able to expand, forming a cool gas having a temperature lower than the temperature of the air in the interior of railcar 100. As can be seen in FIG. 2, in certain embodiments, this gas may be sprayed onto commodities stored in railcar 100, using atomizer 115. Atomizer 115 may be positioned at any location within railcar 100, such that it is able to spray cool gas directly onto commodities stored/transported within railcar 100. This disclosure contemplates that the gas may be routed from valve 110 to atomizer 115 via any type of plumbing located within railcar 100.

This disclosure contemplates that the rate of discharge of the gas from atomizer 115 may be controlled in any suitable manner. For example, in certain embodiments, the rate of discharge may be controlled by valve 110. In such embodiments, valve 110 may be configured to open partially, such that a lower rate of discharge is achieved for a partially opened valve 110 as compared to a fully opened valve 110. As another example, in certain embodiments, the rate of discharge may be controlled by pressure regulator 120.

Pressure regulator 120 may be positioned between tank 105 and electromagnetic valve 110. Pressure regulator 120 may be configured to receive fluid from tank 105 and to adjust the pressure of the fluid. For example, pressure regulator 120 may be configured to reduce the pressure of the fluid received from tank 105. Reducing the pressure of the fluid received from tank 105 may reduce the pressure gradient between the fluid and the air in the interior of railcar 100, thereby decreasing the flow rate of the fluid through atomizer 115. Pressure regulator 120 may also serve to help ensure a uniform rate of fluid flow through atomizer 115. Additionally, pressure regulator 120 may be used to decrease a pressure of the fluid traveling to valve 110, such that the pressure of the fluid at the location of atomizer 115 is sufficiently low as to not damage atomizer 115.

By spraying cool gas directly on the commodities transported within railcar 100, in certain embodiments, backup cooling system 200 may provide supplemental cooling to the commodities within the railcar, in the event of an HVAC system failure or any other circumstance that causes the interior temperature of railcar 100 to rise. In this manner, system 200 may extend the time period during which the HVAC system may be repaired before the commodities within the railcar spoil.

FIG. 3 illustrates a second example embodiment of the railcar backup cooling system, illustrated in FIG. 3 as system 300. System 300 may provide indirect cooling (as opposed to the direct cooling of system 200) to commodities transported in railcar 100, when the temperature in railcar 100 rises above a desired level.

Similar to system 200, system 300 may contain tank 105, valve 110, pressure regulator 120, controller 155, temperature probe 160, door switch 165, HVAC system 170, manual switch 175, fill port 130, gate valve 135, safety valve 125, drainage port 140, gate valve 145, and check valve 150. This disclosure contemplates that tank 105, valve 110, pressure regulator 120, controller 155, temperature probe 160, door switch 165, HVAC system 170, manual switch 175, fill port 130, gate valve 135, safety valve 125, drainage port 140, gate valve 145, and check valve 150 may operate in system 300 in the same manner as described above, in the discussion of system 200.

In contrast to system 200, system 300 includes expansion valve 205, heat exchanger 210, and fan 215, rather than atomizer 110. System 300 may use expansion valve 205, heat exchanger 210, and fan 215 to provide indirect cooling to the interior of railcar 100.

Expansion valve 205 may be used to cool the fluid flowing through expansion valve 205. Expansion valve 205 may receive fluid from valve 110. Expansion valve 205 reduces the pressure and therefore the temperature of this fluid. Expansion valve 205 reduces pressure from the fluid flowing into expansion valve 205. The temperature of the fluid may then drop as the pressure is reduced. As a result, fluid entering expansion valve 205 may be cooler when leaving expansion valve 205. In contrast to system 200, the fluid stored in tank 105 is not released into the interior of railcar 100, in system 300. Therefore, expansion valve 205 may be used to help ensure that the fluid has expanded sufficiently to provide cooling to the interior of railcar 100 prior to entering the coils of heat exchanger 210.

Fluid leaving expansion valve 205 may enter heat exchanger 210. This disclosure contemplates that the fluid entering heat exchanger 210 may be cooler than the interior air within railcar 100. In certain embodiments, heat exchanger 210 consists of a set of coils through which the fluid may flow. Fan 215 may then blow the warmer air of the interior of railcar 100 across the cooler coils of heat exchanger 210. In this manner, the fluid within the coils of heat exchanger 210 may absorb heat from the interior air within railcar 100, thereby providing cooling to the interior of railcar 100. The fluid within the coils of heat exchanger 210 may then be vented to the exterior environment of railcar 100, thereby removing the heat from the interior of railcar 100. This disclosure contemplates that controller 155 may be configured to operate fan 210, such that controller 155 may start fan 210 in response to receiving a signal to open valve 110.

This disclosure contemplates that in certain embodiments, fan 215 may be a component of HVAC system 170, such that fan 215 may both operate to provide cooling to the interior of railcar 100 when HVAC system 170 is operating as usual, and to provide additional cooling to the interior of railcar 100 when HVAC system 170 has failed or is unable to maintain the interior temperature of railcar 100 below the threshold temperature.

By passing cool gas through the coils of heat exchanger 210, thereby absorbing heat from the air surrounding heat exchanger 210, and blowing this air over the commodities transported within railcar 100, in certain embodiments, backup cooling system 300 may provide supplemental cooling to the commodities within the railcar, in the event of an HVAC system failure or any other circumstance that causes the interior temperature of railcar 100 to rise. In this manner, system 300 may extend the time period during which the HVAC system may be repaired before the commodities within the railcar spoil.

FIG. 4 is a flowchart illustrating a method 400 of operating a railcar backup cooling system for use in the railcar 100 of FIG. 1. Generally, various components of railcar 100 may perform one or more steps of method 400. In particular embodiments, by performing method 400, an internal temperature of railcar 100 may be reduced even when a primary cooling system of railcar 100 fails or malfunctions.

In step 405, tank 105 stores a fluid (e.g., a refrigerant like pressurized carbon dioxide). This fluid may be used to cool the contents of railcar 100. In step 410, controller 220 determines whether a condition has been detected that may necessitate the opening or closing of valve 110. For example, the condition may be a measured temperature of the interior of railcar 100 falling below a threshold. As another example, the condition may be a failure of a separate HVAC unit 170 or refrigeration unit in railcar 100. These conditions may cause the internal temperature of railcar 100 to rise, resulting in the contents of railcar 100 spoiling. If the condition is detected, controller 220 opens valve 110 in step 415. If the condition is not detected, controller 220 closes valve 110 or maintains valve 110 in a closed state in step 420.

Modifications, additions, or omissions may be made to method 400 depicted in FIG. 4. Method 400 may include more, fewer, or other steps. For example, steps may be performed in parallel or in any suitable order. Any suitable component of railcar 100 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a railcar cooled using a primary heating, ventilation, and air conditioning (HVAC) system;
a tank positioned within the railcar, the tank configured to store a fluid under a first pressure and at a first temperature, the first pressure greater than atmospheric pressure;
a valve;
a controller configured to:
receive, from the primary HVAC system, an alert message indicating that the primary HVAC system has failed;
in response to receiving the alert message, open the valve such that a portion of the fluid from the tank travels from the tank and through the valve; an expansion valve configured to reduce a pressure of the portion of the fluid from the valve such that the portion of the fluid expands into a gas having a second temperature lower than the first temperature;
a heat exchanger configured to transfer heat from air surrounding the heat exchanger to the gas from the expansion valve; and
a fan configured to circulate the air surrounding the heat exchanger.

2. The system of claim 1, wherein the valve is an electromagnetic valve.

3. The system of claim 1, further comprising a probe configured to measure a temperature in an interior of the railcar, wherein the controller is configured to open the valve in response to the measured temperature exceeding a threshold.

4. The system of claim 1, further comprising a switch configured to detect whether a door of the railcar is open, wherein the controller is configured to close the valve in response to the switch detecting that the door of the railcar is open.

5. The system of claim 1, wherein the heat exchanger is further configured to direct the gas to outside the railcar.

6. The system of claim 1, further comprising a pressure regulator configured to adjust a pressure of the portion of the fluid from the tank.

7. A method comprising:
storing, by a tank positioned within a railcar that is cooled using a primary heating, ventilation, and air conditioning (HVAC) system, a fluid under a first pressure and at a first temperature, the first pressure greater than atmospheric pressure;
receiving, from the primary HVAC system, an alert message indicating that the primary HVAC system has failed;
in response to receiving the alert message, opening a valve such that a portion of the fluid stored in the tank travels from the tank and through the valve; reducing, by an expansion valve, a pressure of the portion of the fluid from the valve such that the portion of the fluid expands into a gas having a second temperature lower than the first temperature;
transferring, by a heat exchanger, heat from air surrounding the heat exchanger to the gas from the expansion valve; and
circulating, by a fan, the air surrounding the heat exchanger.

8. The method of claim 7, wherein the valve is an electromagnetic valve.

9. The method of claim 7, wherein the condition is a measured temperature in an interior of the railcar exceeding a threshold.

10. The method of claim 7, further comprising:
detecting whether a door of the railcar is open; and
closing the valve in response to detecting that the door of the railcar is open.

11. The method of claim 7, further comprising directing, by the heat exchanger, the gas to outside the railcar.

12. The method of claim 7, further comprising adjusting, by a pressure regulator, a pressure of the portion of the fluid from the tank.

13. A system comprising:
a railcar cooled using a primary heating, ventilation, and air conditioning (HVAC) system;
a tank positioned within the railcar, the tank configured to store a fluid under a first pressure and at a first temperature, the first pressure greater than atmospheric pressure;
a valve;
a controller configured to:
receive, from the primary HVAC system, an alert message indicating that the primary HVAC system has failed; and
in response to receiving the alert message, open the valve such that a portion of the fluid from the tank travels from the tank and through the valve and such that the portion of the fluid expands into a gas having a second temperature lower than the first temperature; and
an atomizer configured to spray the gas into the railcar.

14. The system of claim 13, wherein the valve is an electromagnetic valve.

15. The system of claim 13, further comprising a probe configured to measure a temperature in an interior of the railcar, wherein the controller is configured to open the valve in response to the measured temperature exceeding a threshold.

16. The system of claim 13, further comprising a switch configured to detect whether a door of the railcar is open, wherein the controller is configured to close the valve in response to the switch detecting that the door of the railcar is open.

17. The system of claim 13, further comprising a pressure regulator configured to adjust a pressure of the portion of the fluid from the tank.

* * * * *